April 13, 1937.  E. R. HART  2,077,146

MEASURING APPARATUS

Filed July 21, 1934  2 Sheets-Sheet 1

INVENTOR.

Earl R. Hart.

BY Sloughand Canfield

ATTORNEY.

April 13, 1937.　　　　　E. R. HART　　　　　2,077,146
MEASURING APPARATUS
Filed July 21, 1934　　　　　2 Sheets-Sheet 2
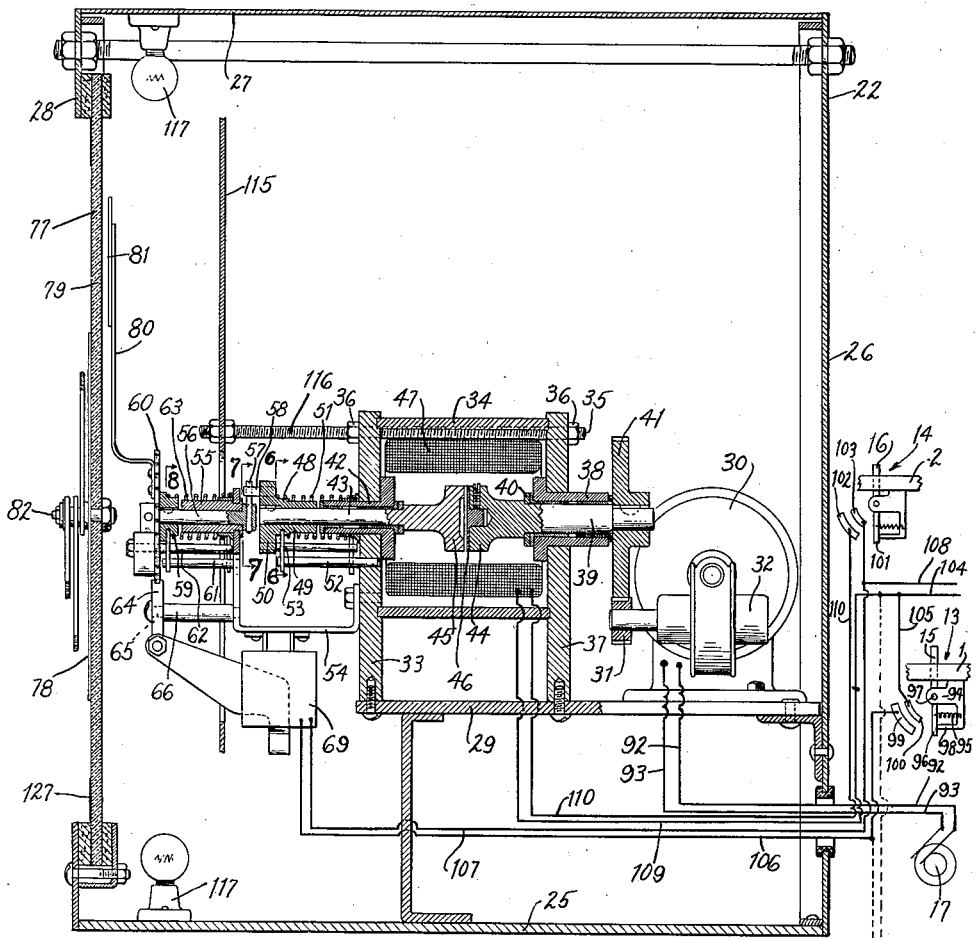
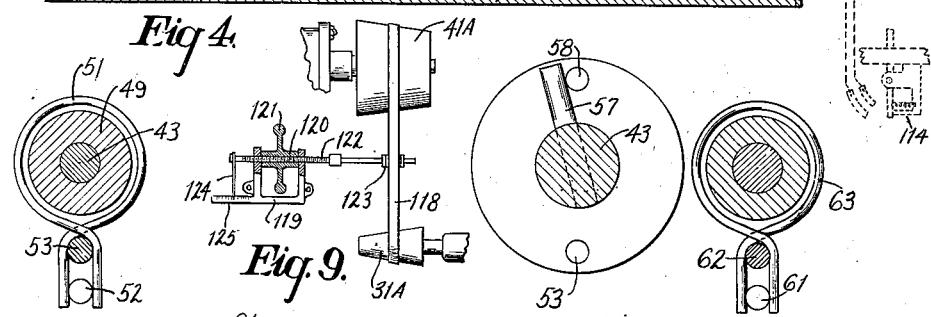
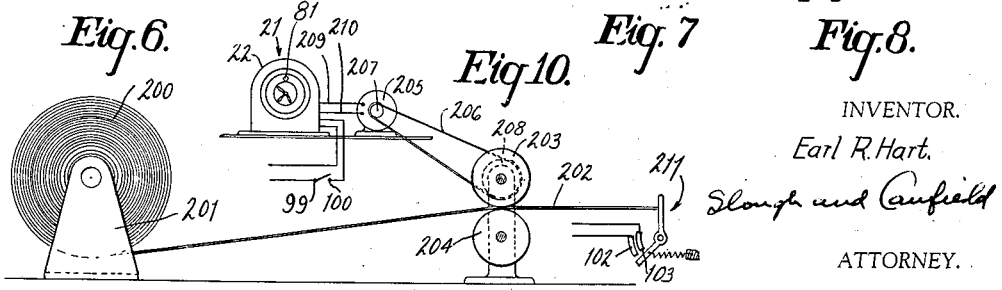
INVENTOR.
Earl R. Hart.
Slough and Canfield
ATTORNEY.

Patented Apr. 13, 1937

2,077,146

UNITED STATES PATENT OFFICE 2,077,146

MEASURING APPARATUS

Earl R. Hart, Cleveland Heights, Ohio, assignor to The Clark Controller Company, Cleveland, Ohio, a corporation of Ohio Application July 21, 1934, Serial No. 736,390

16 Claims. (Cl. 33—141)

This invention relates to measuring devices and particularly to devices for measuring and indicating the lengths of pieces of material.

My invention is particularly adapted to measuring and indicating the successive lengths of a rolled metal sheet as it goes through the successive passes of the rolling mill stand on which the sheet is produced, and, therefore, in connection with the means for adjusting the rolls, my invention relates to the predetermining of the gauge thickness of rolled metal sheets.

It is an object of my invention to provide an improved method and means for measuring or measuring and indicating the lengths of pieces of material.

Another object is to provide an improved method and means for measuring successively the lengths of a succession of pieces of material and for integrating or integrating and indicating the integration of the said lengths.

Another object is to provide an improved method and means for predetermining the gauge thickness of a rolled sheet rolled by a plurality of passes through a roll stand, comprising improved means for successively measuring the lengths of the sheet at the successive roll passes.

Another object is to provide an improved measuring device of the relatively rotatable dial finger and dial type.

Another object is to provide an improved means for actuating measuring devices of the relatively rotatable dial finger and dial type.

Another object is to provide an improved means for actuating measuring devices having relatively movable dial or scale and pointer elements.

Other objects will be apparent to those skilled in the art to which my invention appertains.

My invention is fully disclosed in the following description taken in connection with the accompanying drawings, in which:

Fig. 4 is a longitudinal sectional view taken approximately from the plane 4—4 of Fig. 3 and illustrating diagrammatically circuit connections and apparatus which may be employed therewith in the operation of the embodiment illustrated in Figs. 1 and 2;

Figure 1:
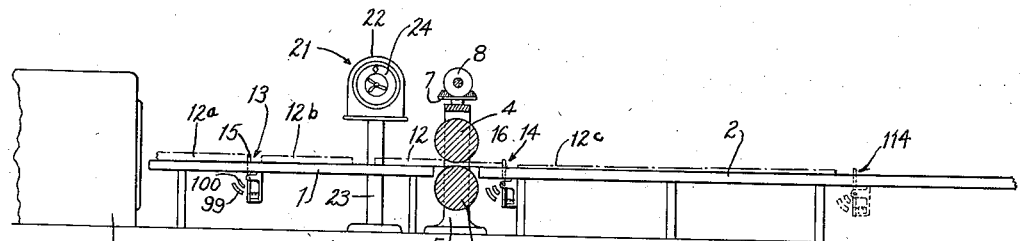
Fig. 1 is a side elevational view illustrating diagrammatically a part of a sheet rolling mill, and illustrating diagrammatically an embodiment of my invention associated therewith.
Figure 2:
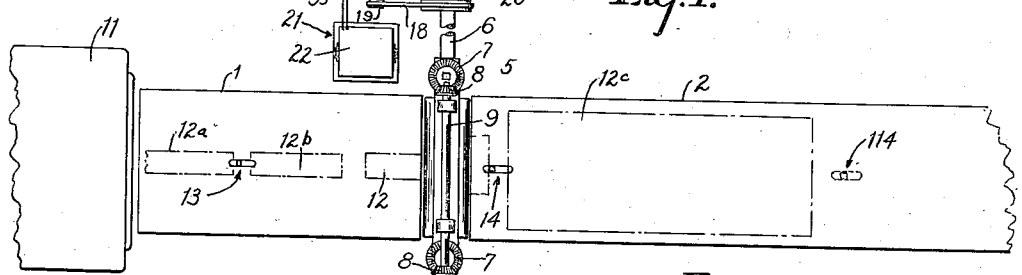
Fig. 2 is a top plan view of the diagrammatic showing of Fig. 1.

Figs. 6, 7 and 8 are, respectively, fragmentary sectional views taken approximately from the planes 6—6, 7—7 and 8—8 of Fig. 4;

Fig. 9 is a view illustrating a modification which may be employed in connection with a part of the apparatus of Fig. 4;

Fig. 10 is a diagrammatic view illustrating an application of my invention to uses other than those illustrated in Figs. 1 and 2.

In connection with Figs. 1 and 2 and 3 to 8 inclusive, I have illustrated my invention as applied to the measuring of the lengths of rolled metal sheets as the sheets pass through the rolls of the mill producing them, upon successive passes thereof. As a part of the embodiment of my invention, apparatus to be described is provided to automatically indicate the length of the sheet after each pass and to indicate the increase of length of the sheet caused by each successive pass through the rolls. By means of this indication, in connection with means conveniently operated by the mill operator, for adjusting the mill rolls, as the rolling process proceeds pass after pass, the operator is able to produce sheets from the mill having the desired gauge thickness to a greater degree of accuracy than has heretofore been possible and more easily and efficiently.

In the greatly simplified diagrammatic apparatus of Fig. 1, I have shown at 1 and 2 mill tables and between the tables lower and upper rolls mounted in a stand 5, connected together to be driven in unison by means not shown, and the lower roll being driven from a shaft 6 connected to a source of power such as a steam engine or electric motor. Screw-down apparatus for raising or lowering the upper roll 4 adjustably is provided comprising beveled gears 7—7 connected to bearing adjusting screws, not shown, pinions 8—8 meshed with the beveled gears 7 connected by a common shaft 9 adapted to be turned by a large diameter hand wheel 10.

By the means thus diagrammatically illustrated and described, and which means is well known in this art, upon turning the hand wheel 10, the upper roll 4 may be raised or lowered and will thereby correspondingly adjust the thickness of a sheet or pack of sheets being rolled between the rolls.

At 11 is indicated a furnace in which sheet bars 12 may be heated preparatory to rolling them.

Indicated generally at 13 and 14 are so-called flag switches comprising each an arm 15 projecting upwardly through a suitable perforation or opening in the tables 1 and 2 and adapted to be operated to close a pair of contacts by engagement with the forward or leading edge of a sheet bar or sheet moving over the table toward the right (as viewed in the drawings) and to permit the contacts to be opened after the bar or sheet has passed over the arm. These switches are reproduced to a larger scale in Fig. 4 and their construction and operation will be more fully described in connection therewith.

At 17, Fig. 2, is illustrated an electric generator, preferably single-phase, driven by a belt 18 on a small pulley 19 on the shaft of the generator, and a large pulley 20 on the roll shaft 6. The pulley 20 may, if preferred, be driven from any part of the motor or engine driving the rolls which rotates at a speed the same as or proportional to the speed at which the rolls are driven.

At 21 generally is indicated an indicating mechanism to be described, preferably housed in a housing 22 supported on a pedestal 23 having an indicating dial 24 disposed to be conveniently visible by the operator who controls the hand wheel 10 above described. The indicator 21 will now be described.

Figure 5:
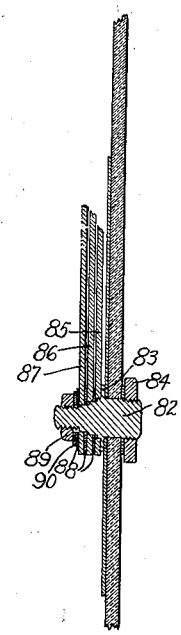
Fig. 5 is a fragmentary view similar to a part of Fig. 4 drawn to a larger scale and with parts thereof in different positions.

Referring to Figs. 4 and 5, the indicator mechanism is housed in the housing 22, the latter comprising a base 25, a rear wall 26, a generally hood-form cover 27 and a front panel 28. These parts may be held together in any suitable manner but preferably the cover 28 is detachably connected to the base 25, for example by screws 27, Fig. 3, whereby it may be removed to give access to the parts thereunder.

A shelf 29 is rigidly supported in the housing and an electric motor 30 of the synchronous type and preferably single phase is secured to and supported on the shelf 29. The motor drives a pinion 31 through a reduction gearing indicated at 32 which may be of the worm-and-gear type to provide a relatively great reduction ratio. A frame comprising uprights 33—37 is supported on the shelf 29 and the uprights 33 and 37 are clamped on opposite ends of a large diameter tube 34 by a through bolt 35 and nuts 36—36. A plurality of such bolts may be provided. A bearing bushing 38 is projected through a suitable perforation in the upright 37 and a shaft 39 is rotatably supported therein. A suitable collar 40 prevents shifting of the shaft outwardly and a gear 41 prevents shifting in the other direction, the gear 41 being disposed to mesh with the pinion 31. A second bushing 42, axially aligned with the bushing 38, projects through the upright 33 and a shaft 43 is rotatably supported therein. The inner ends of the shaft 39 and 43 are provided respectively with heads 44 and 45 having confronting planar faces and a friction disc 46 may be secured to one of the heads.

The heads 44 and 45, shafts 39 and 43, uprights 33 and 37, and the tube 34 are preferably formed from ferrous or magnetic material, and an electro-magnetic winding 47 is disposed within the tube 34 surrounding the heads 44 and 45.

The construction just described constitutes an electro-magnetic clutch. Upon energization of the winding 47, the heads 44 and 45 will be frictionally engaged with each other and rotation of the shaft 39 will be transmitted to the shaft 43 in a well known manner. The shaft 43 has thereon, spaced from the upright 33, a head 48 comprising a shank 49 and a flange 50. The head 48 is rigidly secured to the shaft with the flange 50 spaced from the upright 33. A compression spring of the helical type, 51, is telescoped over the shank 49 and the outwardly projecting portion of the bushing 42, abutting at opposite ends respectively upon the flange 50 and the upright 33, exerting a thrust toward the left as viewed in the drawings on the shaft 43 to normally disengage the heads 44 and 45 when the winding 47 is de-energized.

The inner end of the spring 51 extends downwardly below the shaft 43 and overlaps the side of a pin 52 projecting from the upright 33 (see Fig. 6), and overlaps the side of a pin 53 above the pin 52 projecting inwardly from the flange 50; and the other end of the spring 51 is correspondingly disposed to overlap the opposite sides of these pins. The spring 51 may thus have initial tension therein tending to unwind but restrained therefrom by the said pins.

By this construction it will be apparent that when the shaft 43 is rotated by the motor 30 through the pinion 31, gear 41 and clutch heads 44 and 45, which rotation is predetermined to be counter-clockwise as viewed in Fig. 6, the head 48 will be rotated against the tension of the spring 52, tending always to return it to a normal position determined as indicated in Fig. 6.

Thus, with the motor 30 constantly running, upon energizing the winding 47 to energize the clutch heads 44 and 45, the head 48 will begin to rotate and upon de-energizing the winding 47 to de-energize the clutch heads, the head 48 will instantly return to its original normal position.

A bracket 54 is secured to the upright 33 and has mounted thereon a bearing bushing 55 preferably disposed coaxial of the shaft 43, and a shaft 56 is rotatably supported therein. On the inner end of the shaft 56 and inwardly of the bearing bushing 55, a pin 57 is provided extending substantially radially from the shaft 56 and is disposed to normally overlap a pin 58 extending outwardly axially from the flange 50 of the head 48 at a suitable distance from the axis of the shaft 43. On the outer end of the shaft 56 is provided a head 59 rigidly secured thereto. A ratchet wheel 60 is secured to the head 59. A pin 61 projects outwardly from the bracket 54 under the bushing 55; and a pin 62 projects inwardly from the head 59, and a helical spring 63 is telescoped over the bushing 55, the inner end thereof being extended downwardly to overlap the pins 61 and 62 on one side thereof, and the outer end extending downwardly to overlap the pins on the other side thereof, thus determining a normal rotative position for the head 59 and ratchet wheel 60 thereon.

The pins 58 and 57 are preferably so disposed that they will just engage each other when the heads 48 and 59 are in their normal positions above described.

A ratchet pawl 64 is pivoted as at 65 upon a post 66 projecting from the bracket 54, the pawl engaging the teeth of the ratchet wheel 60, being normally retained in engagement with the teeth by the weight of a tail piece 67 of the pawl on the opposite side of the pivot 65 from the pawl tooth.

An electro-magnetic trip device for the pawl 64 is provided supported upon the bracket 54 and generally depending therefrom, and comprises a magnetic frame 68 secured to the bracket 54, supporting a winding 69 and having a core piece 70 projecting into the winding. An armature 71 is pivoted to the frame 68 as at 72 and has a pole piece 73 adapted to be drawn upwardly into the winding 69 when energized. The armature 71 carries a finger 74 in the end of which is an adjustable screw 75 adapted to engage the tail piece 67 of the pawl 64 when the armature 71 is rocked around its pivot 72. The armature 71 has a de-energized position determined by an adjustable screw 76 upon which it normally rests, the screw being supported on the frame 68.

The front panel 28 has a circular disc 77 of clear transparent glass or other suitable material mounted thereon, and at the center thereof on the outside of the glass is secured an opaque preferably white disc 78, thus providing an annular transparent portion 79. An outer annular portion of the disc 77, as at 127, may be frosted or otherwise rendered translucent if desired.

Figure 3:
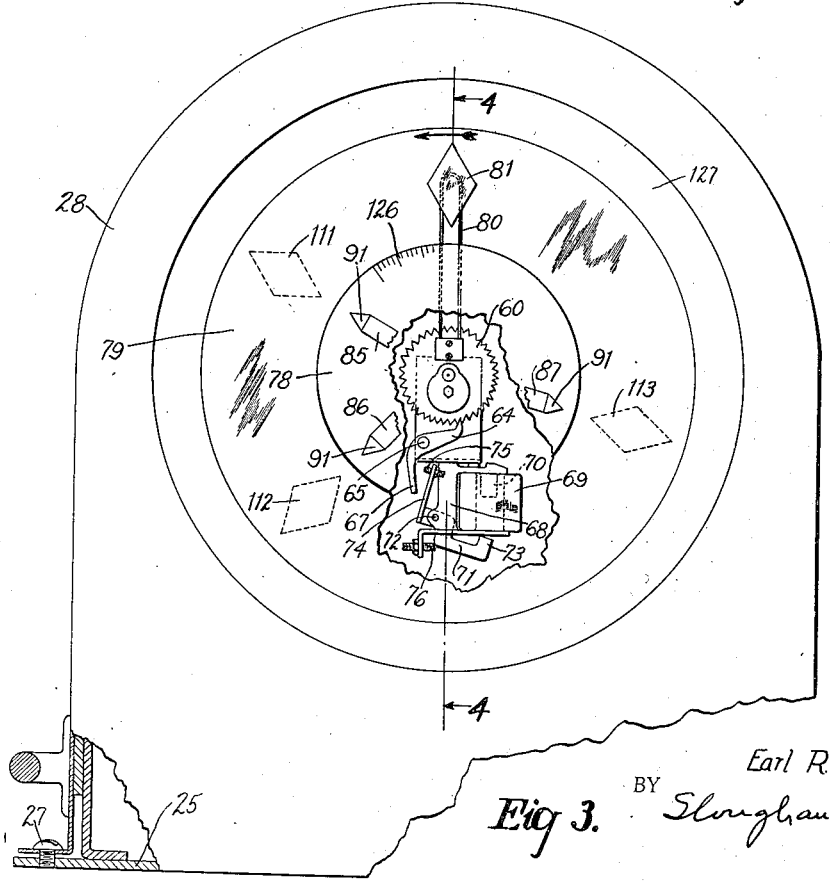
Fig. 3 is a front elevational view of an indicating mechanism embodying a part of my invention illustrated diagrammatically in Figs. 1 and 2 and drawn to a larger scale.

A dial finger 80 is secured to the ratchet wheel 60 and has on its outer end an indicating head 81 of any suitable form but preferably of conventional diamond form with the points vertically opposite. The dial finger 80 is preferably formed from wire as shown in Fig. 3 to render it substantially invisible and the indicating head is preferably formed from flat sheet metal and is disposed to move through the annular transverse portion 79, when viewed from outside upon movement of the ratchet wheel 60.

A short shaft 82, Figs. 4 and 5, is projected through a central perforation in the glass disc 77 and is secured in position by a flange 83 thereon on one side of the glass and a nut 84 on the other side. Projecting outwardly from the glass, the shaft has stepped shoulders thereon over each of which is telescoped a perforated sheet metal dial finger, three preferably being employed as shown at 85, 86 and 87. Friction washer 88—88 may be provided on the outer side of each dial finger; and a nut 89 and washer 90 on the outer end of the shaft 82, by clamping the friction washers against the dial fingers, support the dial fingers rotatively on the shaft 82 and with each dial finger independently maintained in any rotated position. The dial fingers are preferably provided at their outer ends with pointer portions 91—91 adjacent the periphery of the opaque disc 78. In Fig. 3 these dial fingers are illustrated in different positions around the disc 78 but in Fig. 5, in order to better illustrate the same, they have all been rotated to a common or superimposed position.

As illustrated in Fig. 4, in the diagram of connections associated therewith, the motor 30 is electrically connected to be driven by current from the generator 17 which, as described in connection with Fig. 2, is driven at a rate proportional to the speed of the rolls of the mill. The motor 30 is preferably, as stated, a synchronous motor and is self-starting. Thus the motor 30 will at all times be rotatively driven at the speed of the generator 17 and therefore at a speed at all times proportional to the speed of the mill rolls. The wires 92 and 93 connecting the generator to the motor are shown both in Figs. 2 and 4.

Referring to Fig. 4 in connection with Figs. 1 and 2, the flag switches 13 and 14 are reproduced together with the diagrammatic wiring connections therewith. The flag switch 13 is illustrated associated with and mounted upon a fragment of the table 1 and comprises a supporting frame 94 on the table to which the switch arm 15 is pivotally connected below the table. A spring 95 normally holds the arm 15 upright by holding an extension 96 of the arm 15 below the pivot 97 against an abutment 98 on the frame 94. A pair of arcuate contacts 99 and 100 are disposed to be electrically connected together by the arm extension 96 when the arm 15 is rocked clockwise as viewed in the figure.

The flag switch 14, associated with a fragment of the table 2, may be identical with the switch 13, and the arm 16 thereof when rocked may cause an extension 101 thereof to electrically connect a pair of arcuate contacts 102 and 103.

In the operation of the apparatus above described, it is assumed that sheet bars are heated in the furnace 11, Figs. 1 and 2, and as in well known practice a sheet bar such as that shown at 12a is taken from the furnace and placed on the table 1 and progressively moved thereover toward the rolls 3 and 4. The forward end of the sheet bar will engage the arm 15 of the switch 13 and rock the same to close the contacts 99—100 and as the bar proceeds to the position 12b, it will pass over the arm 15 which will be restored and disconnect the contacts 99—100, thus the contacts being only momentarily closed.

The momentary closure of these contacts will cause current to flow, (see Fig. 4) from a current supply main 104 by a wire 105 to the contact 100, thence through the arm extension 96 to the contact 99 and thence by wire 106 to and through the winding 69, and by wire 107 back to the other supply main 108. Energization of the winding 69 will attract the armature 71 and cause the screw 75, (see Fig. 3) to engage the tail piece 67 of the ratchet 64 and disengage it from the ratchet wheel 60. Thereupon, the ratchet wheel and shaft 56 now being free to rotate, will be rotated by the spring 63 to restore the indicating head 81 to its neutral position indicated in Figs. 3 and 4.

After the sheet bar has passed beyond the switch 13, the contacts will be opened as described and the winding 69 accordingly de-energized and the pawl 64 will engage the ratchet wheel and thereafter will ratchet thereover in a manner to be described.

The operator of the mill will by this time have turned the hand wheel 10 to set the two rolls 3 and 4 to a suitable distance apart for the first pass of the sheet bar 12 therethrough. As the sheet bar passes through the rolls, its leading edge will operate the switch 14 by engaging the arm 16 thereof and rocking it to cause the extension 101 to close or engage the contacts 102—103 (see Fig. 4). Thereupon, current will flow from the supply main 104 by wire 109 to and through the clutch winding 47 and back by wire 110 to the contact 102, through the connecting extension 101, to contact 103 and thence back to the other supply main 108.

Energization of the winding 47 will cause the clutch head 45 to be drawn magnetically into frictional engagement with the head 44. The mill rolls 3 and 4, of course, being at this time rotating from power supplied thereto, the generator 17, Figs. 1 and 2, is likewise being driven inasmuch as, as above described, it is connected to the source of power for the rolls; and inasmuch as the synchronous motor 30 is at all times connected to the generator 17, it likewise is running at the predetermined speed which is at all times precisely proportional to the speed of the rolls. Therefore, when the clutch heads 44 and 45 are engaged magnetically as just described, the motor 30, driving the shaft 39 through the pinion 31 and gear 41, will drive the shaft 43. The pin 58 on the head 48 connected to the shaft 43 will pick up the pin 57 and thereby rotate the shaft 56, and through the shaft will rotate the ratchet wheel 60 and the dial finger 80 and indicating head 81 thereon.

Thus, the indicating head 81 will move around the annular clear glass portion 79 of the front panel 28 of the device, Figs. 3 and 1, and the operator who may be standing near the hand wheel 10, Fig. 2, may observe and follow the movement of the indicating head 81. From the foregoing description it will be apparent that the indicating head 81 will move at a predetermined velocity proportional to the rotational speed of the rolls 3 and 4.

When the sheet bar 12, Fig. 1, has passed entirely through the rolls 3 and 4 on the first pass, the sheet, in the position 12c, will pass over the switch 14 allowing the arm 16 to return to its upright position thereby breaking contact at 102—103, correspondingly de-energizing the clutching winding 47. This de-energizes the clutch heads 44 and 45 and thereupon the spring 51 will return the head 48 to its original position, which with the parts shown as in Fig. 4, will be with the pin 58 vertically above the axis of rotation. The shaft 56 and the pin 57 will, however, remain in their rotated position against the tension of the spring 63 tending to return these parts to their original position due to the engagement of the pawl 64 with the ratchet wheel 60.

Movement of the indicating head 81, Figs. 1 and 3, thus is initiated at one end of the rolled sheet 12c and is stopped at the other end thereof so that the amount of its movement from its initial position Fig. 3 is a measure of the length of the sheet on the first pass.

It may be assumed at this time that the sheet bar now going through the mill is a sample bar of accurately known dimensions as to length and cross-section and may be used to calibrate, so to speak, the indicating instrument for the measurement of sheets rolled from successive sheet bars. In this connection, when the indicating head 81 has come to rest as above described, for example in the position 111, Fig. 3, one of the dial fingers such as the finger 85 may be rotated by the operator manually around to a position registering with the position 111 as indicated in Fig. 3, the dial finger 85 therefore indicating a suitable length for the sheet on the first pass.

The "catcher" at the mill now passes the sheet 12c back over the top of the upper roll 4 from the table 2 to the table 1 and it is ready to go through the rolls on the second pass. During this time the operator or "roller" turns the wheel 10 to lower the roll 4 a suitable distance determined by experience. The sheet then goes through the rolls and on the second pass again operates the switch 14, again re-engaging the clutch heads 44 and 45, Fig. 4, and causing the pin 58 to begin rotating with the shaft 43. As will be understood, the dial head 81 will remain stationary in its position 111 until the pin 58 has caught up with the pin 57 and then, because the sheet is longer on the second pass than on the first pass, the magnetic clutch will remain engaged for a longer time and the indicating head 81 will begin to move from the position 111 around to a position such as that indicated at 112, Fig. 3, where it will stop when the trailing end of the sheet on the second pass releases the switch 14. When this occurs, the pin 58 will again be returned to its original position.

The "roller" may now set another dial finger, such as 86, to a position opposite the indicating head at 112 as indicating a suitable length for the sheet on the second pass.

With the apparatus under consideration it is contemplated that the sheet will be finished on the third pass, and it is therefore necessary that the upper roll must be screwed down by the hand wheel 10 to exactly the correct position in order that the gauge thickness of the sheet will be correct after the third pass. To accomplish this the "roller" must screw down the upper roll so that it will cause the sheet to have a precalculated length after the third pass. A third dial fingers 87 may be set to a position indicating the correct length of the finished sheet, and the "roller" may be guided by the distance between the dial fingers 86 and 87 to supplement his experience to enable him to accurately screw down the upper roll to its final or third pass position.

The sheet is then run through the rolls on the third pass and the indicating head is thereby moved around from the position 112 to that indicated at 113, Fig. 3, and the accuracy of the position of the dial finger 87 will thereby be determined.

If necessary, a second bar may be rolled to more accurately determine the position of the dial fingers 87, 86 and 85.

On the rolling of successive bars, the indicating head 81 will move to successive positions corresponding to the positions 111, 112 and 113, and after each of the first two passes, the operator or roller can by observing the position of the indicating head know exactly the length of the sheet and therefore can more accurately screw down the upper roll for the next pass to cause the third pass to produce the desired length of sheet and therefore the desired thickness gauge.

In other words, after each pass, the mill roller, by observing the position of the indicating head 81, can observe instantly the length of the sheet produced by that pass and therefore know its gauge thickness on that pass and be guided thereby to screw down the roll for the next pass, and thus can continuously produce sheets to a far higher degree of accuracy of gauge thickness than has heretofore been possible.

When the sheet is finished and is carried away on the table 2 and another sheet bar is moved onto the table 1, the switch 15 will be operated as above described to trip the ratchet wheel 60 and thereupon the indicating head 81 will be moved back to its original position. If desired, the ratchet may be tripped by the finished sheet, and for this purpose an optional switch, indicated generally at 114, Figs. 1, 2 and 4, may be provided, similar or identical to the switches 13 and 14 and connected as shown in Fig. 4 in parallel with the contacts 99 and 100 of the switch 13 whereby the finished sheet in passing thereover will momentarily energize the ratchet trip winding 69 just as this operation was described as being performed for the switch 13. Thus, either or both of the switches 114 or 13 may be employed to re-set the indicator dial head 81.

The apparatus above described is entirely automatic for the rolling of successive sheet bars into sheets, automatically indicating the increase of lengths of the sheets on each pass and automatically integrating the length increases to indicate the total lengths of the sheets after each pass; and automatically re-setting after the sheets have been finished.

While I have described, in the above, the operation of the apparatus as rolling a single sheet, it will be understood that its operation will be the same where sheets are rolled in packs by the well known processes.

Again, while I have shown the indicating head 81 as at the top of the dial at its starting point, it will of course be obvious that it may be at the bottom or at any other point around the circle if desired.

The dials may be made as large as desired to make them readily visible at any desired distance from the position at which the mill roller may stand. To further facilitate visibility, the dial fingers 85, 86 and 87 may be of a dark color or black and the opaque disc 78 may be white. As stated above, the indicating head 81 may be black, and to render it more readily visible, a white or light-colored back-ground disc 115, Fig. 4, may be provided supported upon the uprights 33 and 37 by suitable studs or the like 116. A lamp or a plurality of lamps 117 may be mounted within the instrument housing 22 energized in any suitable manner from the supply mains 104 and 108 and disposed to illuminate the forward face of the background 115 and concealed from view through the transparent annular portion 79 of the panel. Furthermore, the disc 78 may be large enough in diameter to conceal parts of the mechanism therebehind to avoid visual confusion.

As is well known in the sheet rolling art, the mill rolls are from time to time re-dressed which reduces them in diameter. The smaller rolls, however, may be driven at the same rotational velocity and therefore the indicating head 81 will move with the same velocity, but the rolls will make more revolutions for a given length of sheet and therefore the indicating head in its successive positions will indicate a greater length for a given length of sheet coming from the smaller rolls than it would indicate for the same length of sheet on the larger rolls. This difference may be ignored because the dial may be calibrated on the first run to correspond to the smaller rolls.

If, however, it be desired that the movements of the indicating head 81 shall at all times indicate absolute lengths of sheet, the arrangement indicated diagrammatically in Fig. 9 may be employed. Instead of the pinions 31 and 41 of Fig. 4, the tapered pulleys 31A and 41A may be provided; and instead of direct gear tooth connection as in Fig. 4, the pulleys may be connected by a belt 118. A bracket or other base 119 may be supported within the housing 22 on any suitable support to mount a belt shifting device comprising a stationary nut 120 having a hand wheel 121 for turning it and a longitudinally movable screw 122 provided at one end with a fork 123 engaging opposite sides of the belt 118, and on the other end provided with a pointer 124 movable over a scale 125.

As will be apparent, upon turning the wheel 121, the belt 118 will be shifted longitudinally of the tapered pulleys 31A and 41A to change the ratio of speed reduction effected thereby to correct for the change of roll diameter, and the scale 125 may be calibrated in diameters of the driven roll. Thus, for any diameter of rolls, upon correspondingly setting the dial finger 124 by turning the hand wheel 121, a ratio of velocities will be established to cause the indicating head 81 always to move the same distance for the same length of sheet.

In Fig. 10, I have illustrated diagrammatically the application of my invention to another use, namely that of measuring and indicating the length of a wire or ribbon or sheet or any other material which may be passed between rolls. In the embodiment illustrated in Fig. 10, the material is in the form of a roll 200 and may be mounted to rotate on a support 201. The end of the material 202 is inserted between a pair of rolls 203 and 204 gripping the material therebetween. A single phase generator 205 is belted to one of the rolls as by a belt 206 and suitable pulleys 207 and 208 and supply lines 209 and 210 are led from the generator to the housing 22 above described in which may be provided the same mechanism as that above described. A switch shown generally at 211 is provided which may be identical with the switch 14 above described and disposed opposite the beginning end of the material 202.

Contacts 102 and 103 of the switch 211 may be connected to the indicating device 21 and to the line the same as are the contacts 102 and 103 of the switch 14. A manual switch having contacts 99 and 100 may be connected to the line and to the indicator 21 as are the contacts 99 and 100 of the switch 13.

The contacts 99 and 100 may be momentarily closed to re-set the indicator. Then the end 202 of the material may be drawn through the rolls 203—204 operating the switch 211 to close its contacts and hold them closed, thereby starting movement of the indicating head 81, the generator 205 being operated to generate current by power received from the rotating roll 203 which in turn is rotated by the material 202 passing thereover. If the material is drawn faster at one time than another, it will correspondingly increase the frequency of the generator 205 and the synchronous motor in the indicating apparatus 21 will correspondingly rotate faster so that at all times the indicating head 81 will move at a rate proportional to the rate at which the material 202 moves through the rolls. The distance around the circle of the indicating head 81 from its starting point will at all times indicate the length of the material which has passed through the roll, and obviously any reduction ratio between the motor in the device 21 and the indicating head 81 may be provided so that suitably great lengths or short lengths of material 201 may be indicated on a single revolution of the indicating head 81; or, in the case of great lengths of material, the revolutions of the indicating head 81 may be counted visually.

It will therefore be apparent that my invention is not limited to the rolling of sheets in a rolling mill, although this is one of its more important uses.

In some applications of my invention, it may be desirable to have the indicating head 81 indicate lengths of material in units, for example inches, and for this purpose the disc 91 may have a scale thereon, a fragment of which is indicated at 126, Fig. 3.

My invention is not limited to the exact details of construction shown and described. Other modifications and changes may be made within the spirit of my invention and within the scope of the appended claims.

I claim:

1. In an apparatus for measuring the lengths of pieces of material, a rotatable element having a peripheral portion frictionally engageable with a generally relatively tangentially moving piece to be measured, an electric generator, and means to drive it at speeds constantly proportional to the speed of the rotatable element, an electric motor electrically driven by the generator at speeds constantly proportional to the generator speed, an indicator comprising a movable element driven by the motor, a clutch device operable to effect driving connection and disconnection of the motor with the indicator movable element, means operable by the movement of the piece to effect said clutch operations, and means for holding the movable indicating element in an indicating position after disengagement of the clutch, and means operable by movement of the piece to return the indicating element to a starting position.

2. In an apparatus for measuring the lengths of pieces of material, a rotatable element having a peripheral portion frictionally engageable with a generally relatively tangentially moving piece to be measured, an electric generator, means for driving it at speeds constantly proportional to the speed of the rotatable element, an electric motor electrically driven by the generator at speeds constantly proportional to the generator speed, an indicator comprising a movable element drivable by the motor, means to effect starting and stopping movement of the indicating element comprising means engageable by leading and trailing end portions of the piece, means tending to return the movable indicating element to a starting position, holding means to hold the movable indicating element in an indicating position after disengagement of the clutch, and releasing means operable by movement of the piece to release the holding means.

3. In an apparatus for measuring the lengths of pieces of material, a rotatable element having a peripheral portion frictionally engageable with a generally relatively tangentially moving piece to be measured, an electric generator, and means to drive it at speeds constantly proportional to the speed of the rotatable element, an electric motor electrically driven by the generator at speeds constantly proportional to the generator speed, an indicator comprising a movable element drivable by the motor, means tending to return the movable indicating element to a starting position, holding means to hold the movable indicating element in an indicating position after disengagement of the clutch, and releasing means operable by movement of the piece to release the holding means.

4. In an indicating apparatus, a movable indicating element having a normal starting position, a movable power transmitting element having a normal starting position for moving the indicating element to indicating positions, restoring means tending to return the transmitting element to its starting position, holding means for holding the indicating element in indicating positions, a source of power for moving the transmitting element, and means to intermittently apply power from the source to the transmitting element to cause it to intermittently move the indicating element to successive positions and, between applications of power, to permit the restoring means to return the transmitting element to starting position.

5. In an indicating apparatus, a movable indicating element having a normal starting position, a movable power transmitting element having a normal starting position for moving the indicating element to indicating positions, restoring means and returning means respectively tending to restore the indicating element and return the transmitting element to their starting positions, holding means for holding the indicating element in indicating positions, a source of power for moving the transmitting element, and means to intermittently apply power from the source to the transmitting element to cause it to intermittently move the indicating element to successive positions and between applications of power, to permit the returning means to return the transmitting element to starting position, and releasing means for releasing the holding means to permit the restoring means to restore the indicating element to starting position.

6. An indicating apparatus as described in claim 4 and in which the power source is a continuously operating electric motor and the means to intermittently apply power to the transmitting element is a clutch device.

7. An indicating apparatus as described in claim 4 and in which the power source is a continuously operating electric motor and the means to intermittently apply power to the transmitting element is an electro-magnetically operable clutch device.

8. An indicating apparatus as described in claim 5 and in which the holding means for holding the indicating element is a pawl and ratchet device and the releasing means is an electro-magnetic trip device therefor.

9. In an apparatus for indicating the length of a metal sheet rolled by successive passes between the rolls of a mill, an indicating apparatus comprising a movable indicating element having a starting position, means for moving the indicating element from the starting position at a speed proportional to the sheet velocity, means effective on said indicating element continuously tending to return it to the starting position, means responsive to movement of the sheet to effect movement of the indicating element an amount proportional to the length of the rolled sheet on the first pass, and to effect movement of the indicating element amounts proportional to the increases of length of the sheet on succeeding passes, whereby the final position of the indicating element may indicate the final length of the sheet, and means holding said indicating element in each said indicating position and means to disable the holding means after the last pass.

10. An apparatus as described in claim 9 and in which means is provided responsive to sheet movement after the last pass to effect return of the indicating element to the starting position.

11. In an apparatus for indicating the length of a metal sheet rolled from a sheet bar by successive passes between the rolls of a mill, an indicator comprising a movable indicating element having a starting position, means for moving the indicating element from the starting position at a speed proportional to the sheet velocity through the rolls, means responsive to movement of the sheet to effect movement of the indicating element an amount proportional to the length of the rolled sheet on the first pass, and to effect movement of the indicating element amounts proportional to the increases of length of the sheet on successive passes whereby the final position of the indicating element may indicate the final length of the sheet, and means responsive to movement of a succeeding sheet bar prior to the first pass thereof to effect return of the indicating element to the starting position.

12. In an apparatus for indicating the length of a metal sheet rolled by successive passes of a sheet bar between the rolls of a mill, an indicator comprising a movable indicating element having a starting position, means for moving the indicating element from the starting position to successive positions at speeds proportional to the sheet velocity, means for holding the indicating element in successive positions, said moving means comprising a continuously operable source of power at roll velocity, a power transmitting element having a starting position and movable therefrom by the power source to move the indicating element, restoring means tending to return the transmitting element to its starting position, means responsive to movement of the sheet through each pass to effect corresponding intermittent application of power from the source to move the transmitting element an amount proportional to the length of the sheet and after each application of power to permit the restoring means to return the transmitting element to starting position to cause it to move the indicating element to successive positions successively farther from the starting position whereby each position of the indicating element may indicate the total length of the sheet effected by preceding passes, and the movement of the indicating element from each position to the next may indicate the increment of sheet length of the preceding pass.

13. An apparatus as described in claim 12 and in which means is provided operable to effect return of the indicating element to starting position responsive to sheet movement after the last pass.

14. An apparatus as described in claim 12 and in which means is provided operable to effect return of the indicating element to the starting position after the last sheet pass responsive to movement of a succeeding sheet bar prior to the first pass thereof.

15. In an apparatus for measuring the lengths of pieces of material, a rotatable element having a peripheral portion frictionally engageable with a generally tangentially moving piece to be measured, a movable length indicating element having a normal starting position, a movable power transmitting element having a normal starting position for moving the indicating element to indicating positions, restoring means tending to return the transmitting element to its starting position, holding means for holding the indicating element in indicating positions, a source of power for moving the transmitting element, means causing the movement thereof to synchronize with movement of the rotatable element, and means to intermittently apply power from the source to the transmitting element to cause it to intermittently move the indicating element to successive positions, and between applications of power, to permit the restoring means to return the transmitting element to starting position.

16. The indicating apparatus described in claim 4 and in which means is provided operable to return the indicating element to its normal position.

EARL R. HART.